(12) United States Patent
Maes et al.

(10) Patent No.: US 8,605,181 B2
(45) Date of Patent: Dec. 10, 2013

(54) PIXEL FOR CORRELATED DOUBLE SAMPLING WITH GLOBAL SHUTTER

(75) Inventors: Willem Hendrik Maes, Lommel (BE); Daniel Wilhelmus Elisabeth Verbugt, Helden (BE); Matthias Egbert Sonder, Waterloo (CA); Adrianus Johannes Mierop, Eindhoven (NL)

(73) Assignee: Teledyne Dalsa B.V., Eindhoven (NL)

( * ) Notice: Subject to any disclaimer, the term of this patent is extended or adjusted under 35 U.S.C. 154(b) by 0 days.

(21) Appl. No.: 13/373,717

(22) Filed: Nov. 28, 2011

(65) Prior Publication Data

US 2012/0133811 A1    May 31, 2012

Related U.S. Application Data

(60) Provisional application No. 61/458,642, filed on Nov. 29, 2010.

(51) Int. Cl.
*H04N 5/335* (2011.01)

(52) U.S. Cl.
USPC .......................................... 348/302; 348/308

(58) Field of Classification Search
USPC ................................. 348/302, 308
See application file for complete search history.

(56) References Cited

U.S. PATENT DOCUMENTS

| | | | |
|---|---|---|---|
| 4,866,496 A | 9/1989 | Audier | |
| 4,873,561 A | 10/1989 | Wen | |
| 5,003,565 A | 3/1991 | Yoshida | |
| 5,146,302 A | 9/1992 | Kumada | |
| 5,337,340 A | 8/1994 | Hynecek | |
| 6,342,920 B2 | 1/2002 | Ueno | |
| 6,518,607 B2 | 2/2003 | Hynecek | |
| 6,884,933 B2* | 4/2005 | Akahori et al. | 84/609 |
| 6,947,327 B2* | 9/2005 | Kato | 365/185.22 |
| 7,361,877 B2 | 4/2008 | McGrath et al. | |
| 7,687,832 B2 | 3/2010 | Patrick et al. | |
| 7,728,892 B2 | 6/2010 | Altice, Jr. et al. | |
| 8,284,282 B2* | 10/2012 | Oike | 348/294 |
| 2006/0108614 A1 | 5/2006 | Yi et al. | |
| 2007/0145503 A1* | 6/2007 | Dierickx | 257/431 |
| 2009/0167910 A1 | 7/2009 | Carriere | |
| 2009/0251582 A1* | 10/2009 | Oike | 348/308 |

* cited by examiner

*Primary Examiner* — Lin Ye
*Assistant Examiner* — Amy Hsu
(74) *Attorney, Agent, or Firm* — Eric A. Gifford

(57) ABSTRACT

A method of scanning pixels, each pixel including a photodiode and a sense node formed in the substrate, including a transfer gate coupled between the photodiode and the sense node, and including a memory gate coupled between the photodiode and the transfer gate. The method switches a control signal, connected to a memory gate electrode of all pixels, alternately between a first voltage and a second voltage that is intermediate between the first voltage and a substrate voltage. The first voltage transfers all photo charge in each photodiode into the respective memory gate. The second voltage both (1) holds all photo charge already transferred into the memory gate and (2) blocks further transfer of photo charges into each memory gate. The method further includes reading out photo charge from the memory gate on a row-by-row basis while the control signal is at the second voltage.

4 Claims, 5 Drawing Sheets

PIXEL FOR CORRELATED DOUBLE SAMPLING WITH GLOBAL SHUTTER

The priority of the Nov. 29, 2010 filing date of provisional application No. 61/458,642 is hereby claimed.

BACKGROUND OF THE INVENTION

Description of Related Art

In FIG. 1, a known type of sensor includes an array of pixels, PIX, arranged in rows and columns. For each column of pixels, there is a column bus to which all pixels in the pixel column are connected. Readout electronic circuitry is connected to each column bus.

A known type of four transistor pixel (4T pixel) is depicted in FIG. 2. In FIG. 2, a pixel is formed in a substrate of a p conductivity type. The pixel includes a pinned photodiode formed in the substrate as a deep implant of n conductivity type on top of which is formed a shallow implant of p+ conductivity type. When illuminated, the photodiode accumulates photo generated electrons that migrate in the n region to be adjacent to the p+ region.

The pixel also includes a sense node formed in the substrate from a deep implant of n+ conductivity type. Through ohmic contact, the sense node is connected directly to the source of transistor T1 and the gate electrode of transistor T2.

Transistor T1 is a reset transistor. The "reset" signal is connected to the gate electrode of transistor T1. When the "reset" signal is pulsed positive relative to the potential of the substrate, transistor T1 turns on like a switch. The voltage Vref (a positive voltage relative to the substrate) conducts a transient current through transistor T1 to charge the sense node to the Vref voltage by drawing electrons out of the sense node. The interface between the sense node and the substrate functions as a back biased diode with inherent capacitance.

When the "reset" signal returns to a low voltage (e.g., typically zero volts relative to the substrate), transistor T1 turns off like a switch. The positive charge on the sense node remains trapped on the sense node and imparts a potential equal to the Vref voltage. This potential is still connected to the gate electrode of transistor T2.

Transistor T2 is configured as a source follower (i.e., a trans-impedance amplifier). The drain is connected to the Vref voltage and the source takes on a voltage that follows the voltage on the gate electrode but is offset by a transistor threshold voltage.

Transistor T3 is a selection transistor that is sometimes called a row selection transistor. When the "sel" signal is pulsed positive, transistor T3 turns on like a switch. The voltage on the gate electrode of source follower T2 is copied to the Vout terminal, offset by the threshold voltage VT of the transistor T2.

Between, the photodiode and the sense node is a transfer gate, the gate electrode of which is connected to signal "TG." When the "TG" signal is pulsed positively enough relative to the potential of the substrate, the transfer gate turns on like a switch. A positive TG voltage will create an electrical field that penetrates down into the substrate and attracts the accumulated electrons from out of the photodiode which are then transported laterally to the higher potential of the n+ sense node.

in operation, the pixel operates in four phases: the photo charge integration phase, the reference readout phase, the charge transfer phase and the signal readout phase. When a pinned photodiode is used, an initial cycle through the four phases leaves the n type region the photodiode depleted of photoelectrons at the beginning of a next integration cycle.

A pinned photodiode is formed from a deep implant of n conductivity type on top of which is formed a shallow implant of p+ conductivity type. Then, with a properly designed pixel, Vref can be sufficiently positive that substantially all of the photoelectrons will be attracted to the positively charged n+ type region of the sense node during the charge transfer phase leaving the photodiode empty of mobile electrons at the beginning of the next integration cycle. After the initial cycle, successive repeated cycles of the integration phase (first phase), the reference readout phase (second phase), the transfer phase (third phase) and the signal readout phase (fourth phase) capture successive images.

More particularly, during the photo charge integration phase (first phase), the signals "reset" and "TG" are set low to turn off the transfer gate and turn off transistor T1. The "reset" signal is normally high during the integration time. This tends to minimize the occurrence of blooming effects. Blooming effects occur during the integration time when excess charge carriers are generated in the photodiode. Without this some anti-blooming means, the excess charge carriers tend to flow to neighboring pixels causing a blooming effect. However with this first phase, charge carriers that would otherwise flow to neighboring pixels are instead drawn to the sense node that has been reset to Vref volt and the excess charge carrier do not flow to neighboring pixels, avoiding blooming effects.

The photodiode is illuminated and photoelectrons are generated and captured in the photodiode during the charge integration phase. As these photoelectrons accumulate in the n region of the photodiode, the potential of the n region declines from the photodiode pinning voltage (i.e., the voltage in the n-region when all electrons have been migrated from it, at which it was set) to a tower voltage that is defined by the number of photoelectrons accumulated from the effects of illumination received.

During the reference readout phase (second phase), the signal "TG" remains set low to maintain the transfer gate in an off state while the illuminated photodiode continues to accumulate photoelectrons in the n region of the photodiode so the potential of the n region continues to decline. However, the signals "reset" and "sel" are temporarily pulsed sufficiently positive to turn on reset transistor T1 and turn on selection transistor T3. The reference potential Vref is first set onto the n+ region of the sense node and then copied by source follower T2 and transferred through selection transistor T3 to the pixel's Vout terminal.

During the charge transfer phase (third phase), signals "reset" and "sel" are maintained low to turn off transistors T1 and T3 while signal "TG" is pulsed sufficiently positive to turn on the transfer gate so that mobile charges can freely transfer between the n region of the photodiode and the n+ region of the sense node. Since charges can now freely migrate between the n region of the photodiode and the n+ region of the sense node, the voltage on the n region of the photodiode increases as electrons migrate out and the voltage on the n+ region of the sense node decreases as electrons migrate in until the photodiode is completely empty.

During the signal readout phase (fourth phase), signal "sel" is again pulsed sufficiently positive to turn on selection transistor T3. The voltage stored on the n+ region of the sense node is then copied by source follower T2 and transferred through selection transistor T3 to Vout.

In a sensor, multiple pixels are arranged in a column having a column bus (see FIG. 1). Each pixel in the column is connected at its Vout terminal (i.e., the source of the selection transistor T3) to the column bus. Readout electronics connected to the column bus calculate a difference voltage by subtracting the reset reference voltage (transferred to the readout electronics during the integration phase) from the sensed voltage (transferred to the readout electronics during the readout phase) for each pixel in a process called "correlated double sampling" or CDS.

However, since the pixels are read out on a row by row basis, the pixels in the top row are readout at a significantly different time than the pixels in the bottom row. This is called a rolling shutter effect and can cause distortion of images captured. For example, a hovering humming bird has rapidly moving wings. Pixels of an image at a tip of a wing may be captured at a different time than pixels of the image at a root of the wing, thus creating a distorted final image where the wing might appear unnaturally bent.

A known deviation from the 4T pixel structure is depicted in FIG. 3. This structure is used to overcome the rolling shutter effect. In FIG. 3, a memory gate is interposed serially between, the transfer gate and photodiode of FIG. 2. The gate electrode of the memory gate is connected to an "MG" signal. A global capacitor, C_global, is connected at one end to the node between the memory gate and the transfer gate, and connected at the other end to ground. Such a capacitor is often made from a back biased diode as depicted in FIG. 3. A second reset transistor is connected at its source to the node between the memory gate and the transfer gate, and connected at its drain to the reference voltage Vref. The gate electrode of the second reset transistor is controlled by second reset signal R2.

In operation, at a time close to the end of a photodiode integration cycle, the second reset signal R2 is momentarily pulsed to a high voltage to turn on the second reset gate while the memory gate and transfer gates remain off. This resets the global capacitor to voltage Vref. Then after the end of the photodiode integration cycle, signal "MG" is momentarily pulsed to a high voltage to turn on the memory gate while the second reset transistor and the transfer gate remain off. The signal "MG" pulse is long enough for all of the photo charge in the photodiode to be transferred to the global capacitor, C_global. This operation occurs simultaneously in all pixels, PIX, in all rows and columns. At the end of this process, the image originally held in the array of photodiodes is quickly and simultaneously transferred to the array of global capacitors. Thereafter, the photodiodes commence a new integration cycle and the transfer gate, the sense node, and transistors T1, T2 and T3 commence scanning the image stored in the global capacitors on a row by row basis.

This implementation has some serious drawbacks.

1. To each pixel must be added a capacitance, C_global, a memory gate and an extra transistor to reset this capacitance. This increases the area needed for the pixel without increasing the area of the photodiode, thus lowering the fill-factor.
2. Extra control lines R2 and MG must be routed over the whole of the pixel array to control the reset of the capacitance C_global in each pixel and control the global shutter sampling of the whole array of photodiodes. This leads to more complicated wiring, and again, a lower fill-factor for the pixels.
3. In addition, a pixel according to FIGS. 2 and 3 will have extra reset capacitance noise.

SUMMARY OF THE INVENTION

An example of a method of scanning an array of pixels that are arranged in rows and columns includes switching a memory gate control signal and reading out. Each pixel includes a photodiode formed in a substrate and a sense node formed in the substrate. A transfer gate is coupled between the photodiode and the sense node. A memory gate is coupled between the photodiode and the transfer gate, the memory gate including a memory gate electrode. The memory gate control signal is connected to the memory gate electrode of all pixels in the array. The switching of the memory gate control signal includes switching the memory gate control signal alternately between a first voltage measured relative to a potential of the substrate and a second voltage measured relative to the potential of the substrate. The second voltage is intermediate between the first voltage and the potential of the substrate. The first voltage is sufficiently different from the potential of the substrate to transfer substantially all photo charge in the photodiode into the memory gate in each pixel of the array of pixels. The second voltage is both (1) sufficiently different from the potential of the substrate to hold in the memory gate all photo charge transferred into the memory gate in each pixel of the array of pixels and (2) sufficiently different from the first voltage to block transfer of photo charges in the photodiode into the memory gate in each pixel of the array of pixels. The reading out reads out substantially all photo charge transferred into the memory gate in each pixel of the array of pixels on a row-by-row basis while the memory gate control signal is at the second voltage.

BRIEF DESCRIPTION OF DRAWINGS

The invention will be described in detail in the following description of preferred embodiments with reference to the following figures.

DETAILED DESCRIPTION OF PREFERRED EMBODIMENTS

Figure 1:
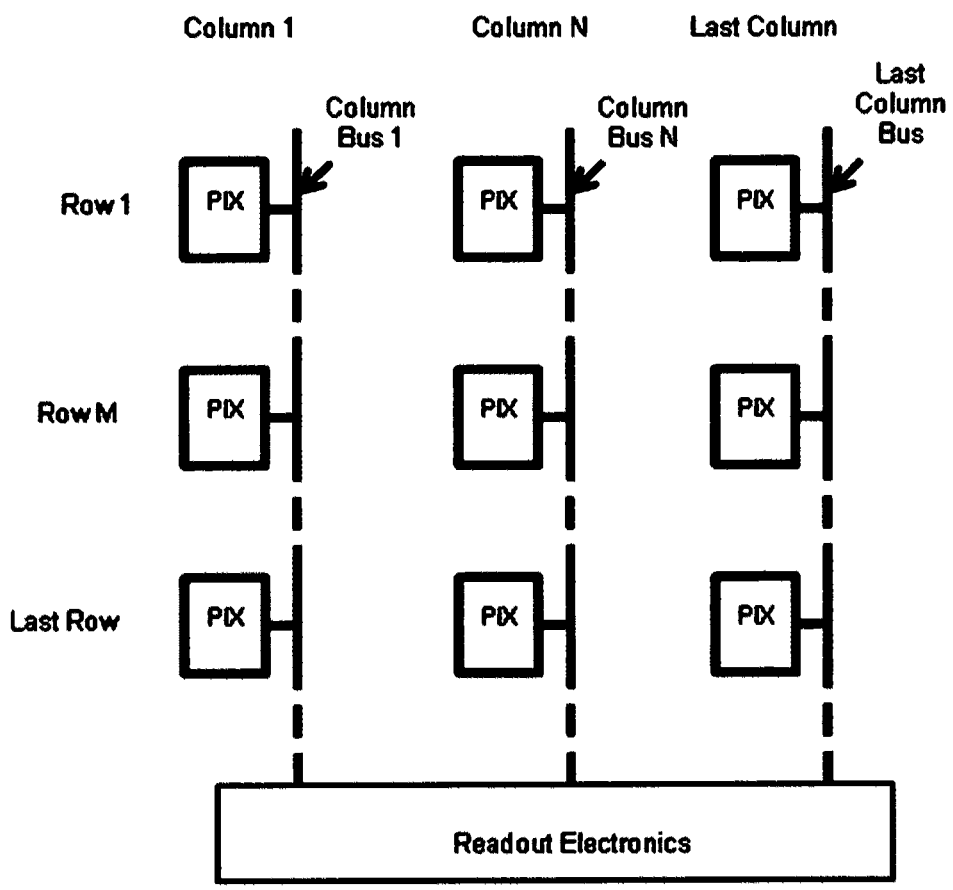
FIG. 1 is a schematic plan view of a known sensor.
Figure 2:
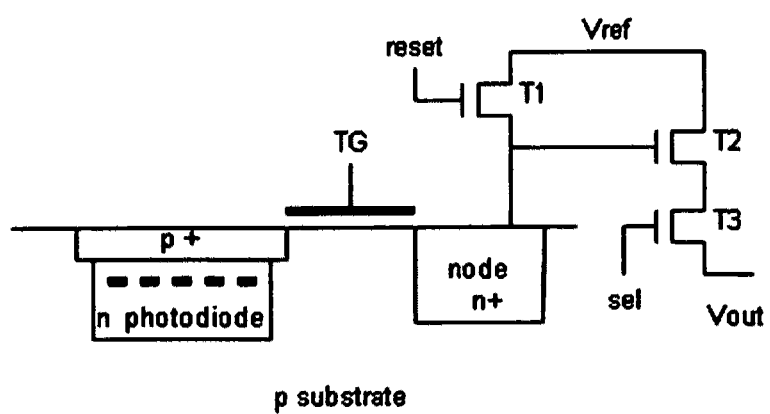
FIG. 2 is a schematic section view through a known 4T pixel.
Figure 3:
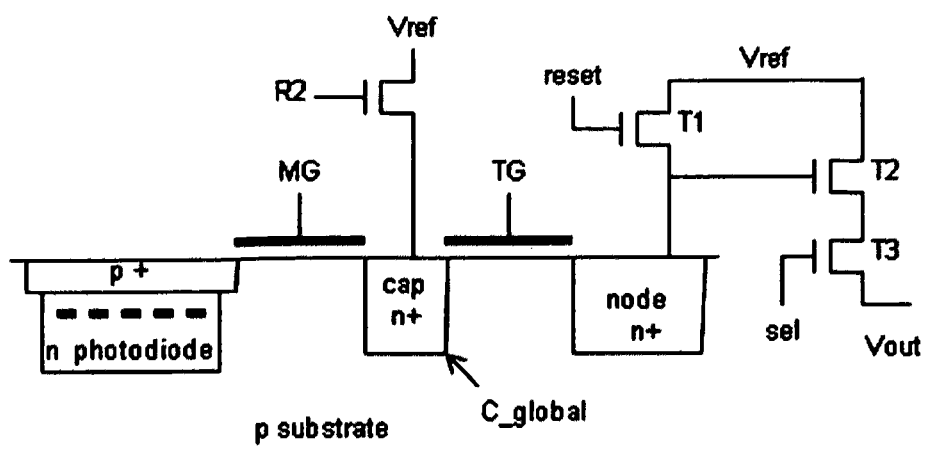
FIG. 3 is a schematic section view through an augmentation of the known 4T pixel of FIG. 2.
Figure 4:
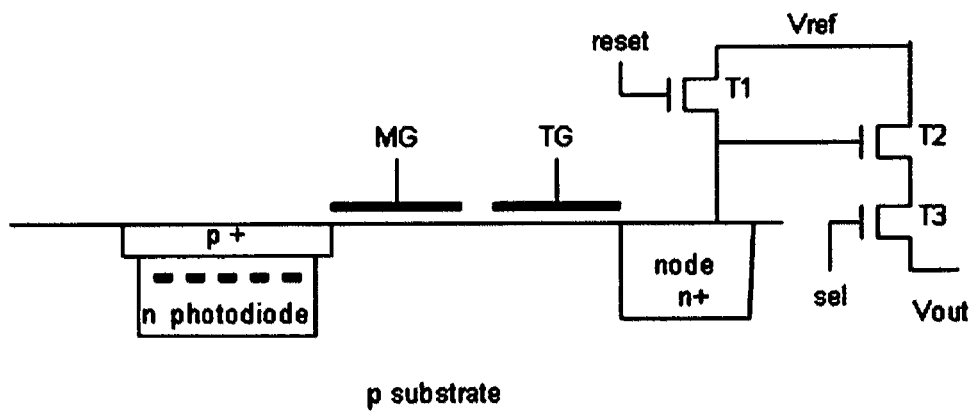
FIG. 4 is a schematic section view through a 5T pixel example of the present invention.

An improvement to the pixel of FIGS. 2 and 3 is a five transistor pixel (5T pixel) depicted in FIG. 4. In FIG. 4, a memory gate is disposed between the photodiode and the transfer gate. The memory gate comprises a gate electrode insulatively disposed over the substrate of p conductivity type. A control signal "MG" is connected to the gate electrode of the memory gate. Unlike operating the pixels of FIGS. 2 and 3, operating the pixel of FIG. 4 applies control signal "MG" with voltages to operate the memory gate more as an analog gate than a digital switch as discussed herein.

With this structure, the fill-factor of known type pixels is much improved since the memory gate of FIG. 4 performs the function of the storage capacitor of FIG. 3 by attracting and storing photoelectrons and performs the function of the memory gate of FIG. 3 by controlling the transfer of photo-electrons into the storage function performed by the memory gate itself instead of the capacitor of FIG. 3. Furthermore by using the memory gate of FIG. 4, there is no need for the second reset transistor, and therefore, there is no reset or capacitance noise involved in this process.

When, signal "MG" is low or zero with respect to the potential of the p substrate, a region beneath the gate electrode in the p substrate is of p conductivity type is characterized by a sparse density of mobile electrons and a higher density of positively charge "holes" imparting an overall p conductivity type to the region.

Figure 5:
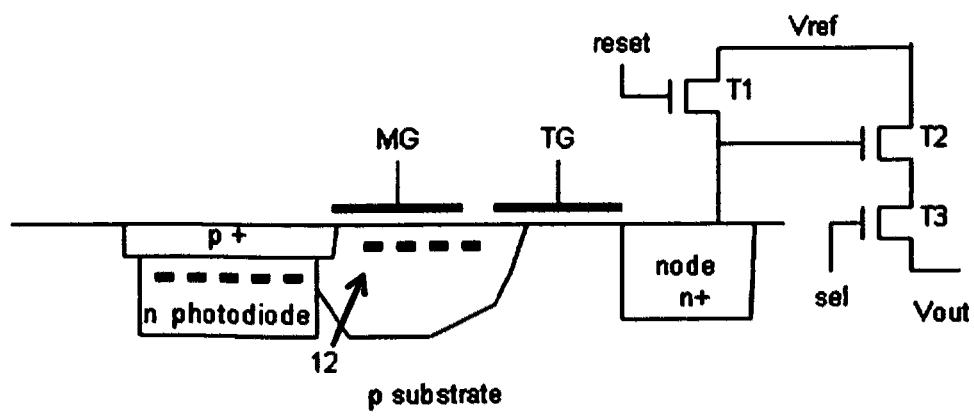
FIG. 5 is a schematic section view through a 5T pixel example of the present invention with a high voltage applied to the memory gate electrode.

However as depicted in FIG. 5, when the "MG" signal is highly positive, photoelectrons generated in the photodiode are attracted into channel 12 that is a region under the gate electrode of the memory gate. Channel 12 is defined by the strong electric field induced into the substrate by the highly positive "MG" signal. It is a depletion region that attracts electrons from the photodiode, and this depletion region is large enough to encompass the photodiode.

Figure 6:
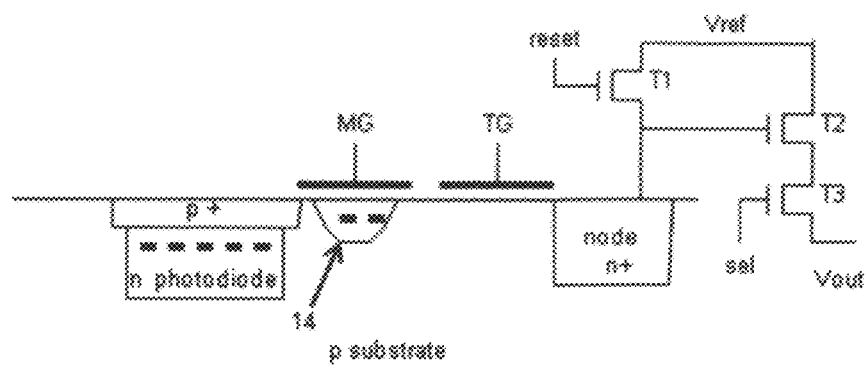
FIG. 6 is a schematic section view through a 5T pixel example of the present invention with an intermediate voltage applied to the memory gate electrode.

In FIG. 6, signal "MG" is changed to a lesser but still positive voltage relative to the potential of the substrate, and this lesser voltage is intermediate between the highly positive voltage depicted in FIG. 5 and the voltage of the substrate.

When signal "MG" is intermediately positive, as depicted in FIG. 6, the depletion region 14 becomes smaller, excluding now the photodiode region. The smaller depletion region 14 is still created wider the gate electrode of memory gate. The size of the region that constitutes the n type channel 14 is smaller than the comparable region 12 depicted in FIG. 5 yet still large enough to hold all the photoelectrons originally transferred to region 12. The smaller region depicted in FIG. 6 is of such size that there is no longer a conduction path from the n type region of the photodiode into the n type channel. Photo-electrons that were transferred from the photodiode to channel 12 depicted in FIG. 5 become trapped in the smaller channel 14 depicted in FIG. 6.

The structure and operation of the pixel of FIG. 4 combine the functions of both the MG gate and capacitor into one gate, increasing the fill-factor of the pixel. The working principle is as follows. First, during the end of the integration time, the MG gate voltage is pulsed high globally over the pixel array. The carriers residing in each photodiode are attracted to the surface of the respective MG gate. During this time, the transfer gate (TG) input voltage stays low, forcing the carriers to stay at the MG gate surface. Second, the MG gate voltage is lowered, although NOT to zero volts. The low level value of the MG voltage is that voltage which still attracts the carriers so as to stay under the MG gate, but also isolates the photo-diode to allow the photodiode to start integrating again for the next frame.

In this way, there is an array of charges formed underneath the respective MG gate electrodes where the carriers originated from the respective photodiodes during the previous frame. The carriers that are integrating in the current frame and the carriers held in the MG gate from the previous frame are separated by a potential barrier (see FIG. 8) in the silicon. This barrier is controlled by the MG gate voltage and must be as high as possible to maximize storage capacity but still fulfill the following requirements:

1. The 'high' voltage on the MG gate electrode must be able to attract all mobile carriers from the photodiode towards the surface under the MG gate electrode.
2. The 'low' voltage (but non-zero voltage) on the MG gate electrode must be low enough to permit the transport of the mobile carriers from under the MG gate electrode to the sense node when the TG gate is on.
3. The 'low' voltage (but non-zero voltage) on the MG gate electrode must be at a voltage level that is able to separate charges collected during the previous frame but residing under the MG gate electrode from the charges being collected during the current frame in all conditions. Worst case conditions include all combination of when the current frame is full/empty and the previous frame is empty/full.
4. The 'low' voltage on the MG gate should be low enough to allow lateral charge transport via the TG gate to the sense node. Due to this transport, the potential underneath the MG gate increases. This voltage increase should not initiate transport from the photo-diode electrons.

The gate transistor of the memory gate is NOT used as a digital switch, transistor (i.e., having two states: high and low), but instead, is used more as an analog switch. The actual parameters of the gate transistor may vary within a range across the array, and therefore, the intermediate voltage (i.e., the 'low' value) of the "MG" signal is adjusted to provide adequate isolation and adequate conduction under all operating conditions as discussed above.

The range between the high voltage and the intermediate voltage of the "MG" signal creates an "hysteresis" effect as discussed more fully below. When manufacturing such an array of pixels, the high voltage and the intermediate voltage of the "MG" signal may be selected with sufficient margins to accommodate the range of transistor parameters resulting from manufacturing tolerances and still provide adequate "hysteresis." The flexibility in selecting the high voltage and the intermediate voltage of the "MG" signal has the advantage of greater manufacturing yield as compared to pixels where the voltages are required to be tightly controlled.

Using a process simulator, the cross-sections as shown in FIGS. 4-6 were constructed for an imaging pixel. Boundary voltages were applied to the pixel structure and corresponding currents/charges were calculated using a device simulator.

Figure 7:
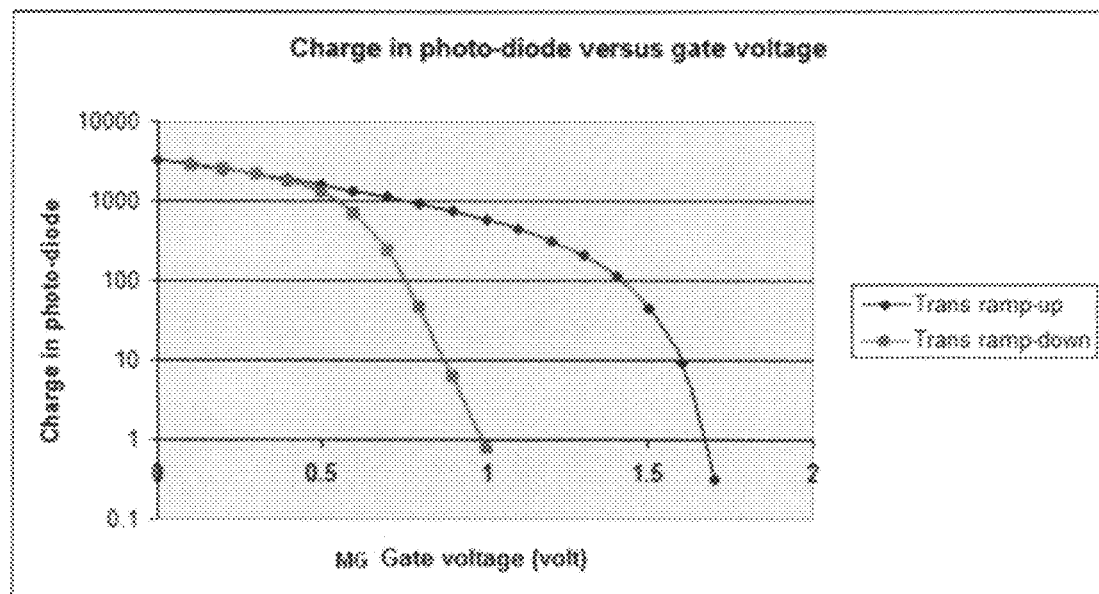
FIG. 7 is a graph showing the charge held in the photodiode as a function of the voltage applied to the memory gate electrode (MG) first as the voltage ramps up where the number of electrons in the photodiode decreases to one when the voltage increases to about +1.7 volts and then as the voltage ramps down where the number of electrons in the photodiode does not begin to increase above one until the voltage decreases below about +1.0 volts

FIG. 7 depicts the simulation results for the emptying of the photodiode when applying a gate voltage to the MG gate. As the voltage on the MG gate electrode gradually increases, first some charges were pulled out, then all charges were pulled out of the photodiode when the MG gate electrode voltage reached about 1.7 volts. As the MG gate electrode voltage is gradually decreased, all charges stay underneath the MG gate electrode (and are not transfer back into the photodiode) until the gate voltage falls below a threshold of about 1 volt. These simulation results suggest the existence of an "hysteresis"

effect where, in this example, it takes +1.7 volts applied to the MG gate electrode to fully void the photodiode of mobile charge carriers, but the voltage on the MG gate electrode can be reduced to only +1 volt without any of the charge being shifted back into the photodiode. In effect, the "hysteresis" is 0.7 volts.

This "hysteresis" effect is exploited in an array of pixels arranged in rows and columns. By pulsing signal MG to momentarily exceed +1.7 volts, all mobile charges that may exist in the photodiode of each pixel in the array are simultaneously transferred to channel 12 (FIG. 5) of the respective pixel that is created beneath the MG gate electrode. This captures an image frame. Then, by lowering the voltage of signal MG to a voltage slightly greater than +1 volt, these charges are held beneath the MG gate electrode as the next image frame is independently accumulated in the photodiodes of the respective pixels in the array. While the next image frame is being accumulated in the photodiodes, the pixel readout transistors sequentially read out the captured mobile charges held beneath the MG gate electrode of all pixels in the array on a row by row basis at such a rate that all data can be read out in time to allow an new image frame to be transferred from the photodiodes to the channel beneath the MG gate electrode.

This operation allows holding the charges of the previous frame underneath the MG gate electrode while integrating the current frame at the same time. The wider the hysteresis barrier is, the more charges can be stored in the pixel further improving the dynamic range of light intensity that can be captured.

Figure 10:
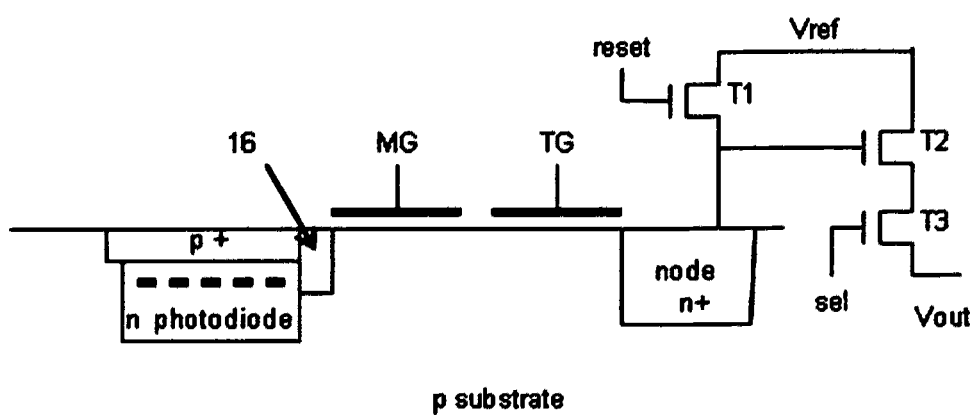
FIG. 10 is a schematic section view through a 5T pixel similar to the pixel of FIG. 4 but with a shallow implant to increase the hysteresis effect.

FIG. 10 depicts a 5T pixel similar to the pixel of FIG. 4 but with a shallow implant 16 to increase the hysteresis effect. In the present example, the p-type substrate is further doped in shallow implant region 16 to increase the hysteresis effect, allowing more charges to be stored in the pixel. This p-type doped region has the following properties:
1. It must be very shallow.
2. It is located in between the MG-gate and the embedded photo-diode n-type doped region.
3. The concentration must be chosen such that the pixel still works properly within the allowed voltage ranges.

Figure 8:
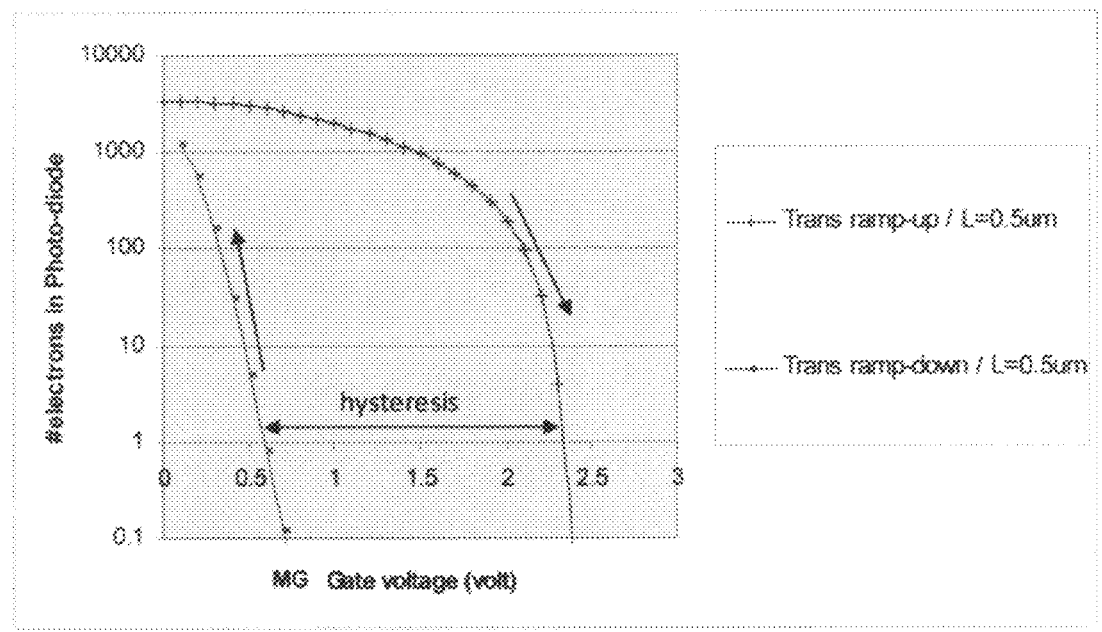
FIG. 8 is a graph showing the charge held in the photodiode as a function of the voltage applied to the memory gate electrode with a shallow implant below the memory gate electrode first as the voltage ramps up where the number of electrons in the photodiode decreases to one when the voltage increases to about +2.3 volts and then as the voltage ramps down where the number of electrons in the photodiode does not begin to increase above one until the voltage decreases below about +0.6 volts

Using additional shallow implant 16 underneath the MG gate electrode at a location adjacent to, and in contact with, the photodiode increases the potential barrier between the MG gate and the photodiode into the depth of the pixel. The simulation results on the pixel that includes the additional implant is depicted in FIG. 8. The hysteresis gap has grown from about 0.7 volts to about 1.7 volts, allowing the storing of many more charges in this new pixel.

The pixel is incorporated in a pixel array arranged in rows and columns. The operation of the array is organized around integration periods. During each integration period, photoelectrons are accumulated in each photodiode in quantities proportional to the light incident on the photodiode. At the end of the integration period, the accumulated photoelectrons in each photodiode are transferred to a respective memory gate by maintaining signal TG low (or near zero) relative to the substrate potential and pulsing signal MG sufficiently positive relative to the substrate potential to form large channel 12 (FIG. 5) so that photoelectrons in all photodiodes are simultaneously transferred to channel 12 of a corresponding memory gate. See "signal MG" in FIG. 9. This is referred to as a "global shutter." Thereafter, signal MG is changed to a positive voltage relative to the substrate potential that is intermediate between the highly positive voltage depicted in FIG. 5 and the substrate potential to form isolated channel 14 (see FIG. 6) and block re-transfer of charges back into the photodiode. This "transfer and hold" operation occurs simultaneously in every pixel in the array of pixels arranged in rows and columns. Note that in FIG. 9, "signal MG" switches between a high positive potential (e.g., 2.5 volts in FIG. 8) and an intermediate positive potential (e.g., 0.7 volts in FIG. 6) to exploit the hysteresis of the pixel disclosed herein.

After signal MG is pulsed sufficiently positive to transfer photoelectrons from the photodiode to channel 12 and then signal MG is thereafter changed to an intermediately positive voltage to form, isolated channel 14, the photodiode is allowed to accumulate new photoelectrons during a new integration period. While new photoelectrons accumulate in the photodiode, readout transistors sequentially read out the captured mobile charges held beneath the MG gate electrode of all pixels in the array.

The captured mobile charges held beneath the MG gate electrodes are read out on a row by row basis. See FIG. 9. The integration period is divided into as many row readout periods as there are rows of pixels to be read out. Each row readout period is allocated for the readout of a corresponding row of pixels of the previous frame.

Figure 9:
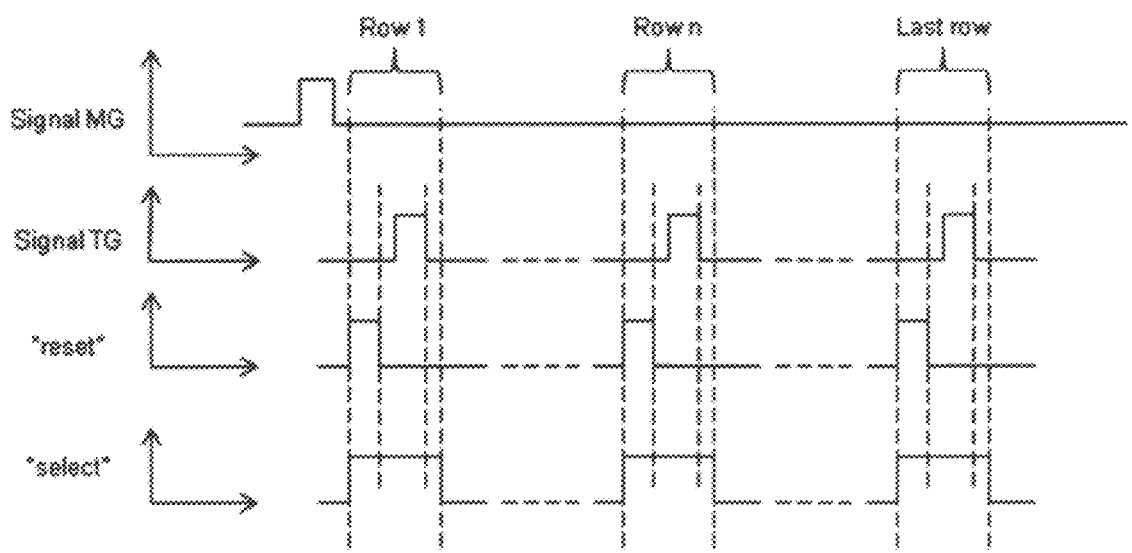
FIG. 9 is a timing diagram for CDS readout with global shutter.

In FIG. 9, each row readout period includes 2 phases: a reference readout phase and a signal readout phase.

In the reference readout phase, signal "TG" remains set low to maintain the transfer gate in an off state while the signals "reset" and "sel" are temporarily pulsed sufficiently positive to turn on reset transistor T1 and turn on selection transistor T3. Thereafter, transistor T1 is turned off a bit before the end of the reference readout phase. The reference potential Vref on the n+ region of the sense node is now copied by source follower T2 and transferred through selection transistor T3 to the pixel's Vout terminal. The voltage at the pixel's Vout terminal becomes the reference readout of the pixel.

In the signal readout phase, after the reference readout phase, the "reset" signal is remains low to maintain transistor T1 in an off state and the "TG" signal is temporarily pulsed sufficiently positive to turn on the transfer gate while signal "sel" remains high to maintain transistor T3 in an on state. While signal "TG" is pulsed sufficiently positive to turn on the transfer gate, photo generated mobile charges can freely transfer between the n type depletion region of channel 14 (FIG. 6) and the n+ region of the sense node. The voltage on the n region of channel 14 increases as electrons migrate out of the channel and the voltage on the n+ region of the sense node decreases as electrons migrate into the sense node. Soon, all charges are transferred to the sense node since Vref is sufficiently positive for the sense node to attract all of the charge in channel 14. The "TG" signal remains positive sufficiently long to transfer charges from channel 14 to the sense node, but typically returns low to turn off the transfer gate a bit before the end of the signal readout phase. However, the "TG" signal remains high long enough for the sense node to be set to the reference voltage Vref minus the voltage adjustment that results from the transfer of electrons from channel 14 to the sense node. This voltage adjustment is directly proportional to the number of electrons transferred, and the constant of proportionality is the capacitance of the sense node. The reference potential Vref plus the voltage adjustment that has been set onto the n+ region of the sense node is then copied by source follower T2 and transferred through selection transistor T3 to the pixel's Vout terminal. The voltage at the pixel's Vout terminal becomes the signal readout of the pixel.

After the signal "reset" returns low and before the signal TG goes high, there is a brief period in which both signals are low.

Output circuitry that is not a part of an individual pixel subtracts the reference readout voltage from the signal readout voltage to produce a difference output voltage. This difference output voltage is directly proportional to the number of electrons transferred from channel 14 to the sense node. This difference output signal is defined by the number of photoelectrons accumulated from the effects of illumination received. This process is called correlated double sampling (CDS) and the difference output signal is often called the correlated double sampling signal (CDS signal).

A problem with large pixel arrays is that transistor threshold voltages for transistors such as source follower T2 may vary slightly from pixel to pixel based on the pixel's location over large pixel arrays due to slight processing differences or other causes. However, the CDS process uses differential processing that subtracts the reference signal from the measured signal. The reference signal is processed through the same transistors that might be subject to slight threshold variations over an array. Since both reference and signal pass through the same transistors, many of the slight differences in transistor properties are eliminated by a using CDS readout.

Having described preferred embodiments of a novel method for operating a pixel using correlated double sampling with a global, shutter (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as defined by the appended claims.

Having thus described the invention with the details and particularity required by the patent laws, what is claimed and desired protected by Letters Patent is set forth in the appended claims.

What is claimed is:

1. A sensor formed in a substrate of a first conductivity type, the sensor comprising readout circuitry, a memory gate control circuit and an array of pixels arranged in rows and columns, each pixel comprising:
   a photodiode formed in the substrate;
   a sense node formed in the substrate;
   a transfer gate coupled between the photodiode and the sense node; and
   a memory gate insulatively disposed over the substrate, said memory gate coupled between the photodiode and the transfer gate, the memory gate including a memory gate electrode having a surface disposed on the substrate, wherein said substrate comprises no region of a conductivity type opposite the first conductivity type underneath said memory gate electrode;
   wherein the memory gate control signal circuit includes generator to generate a memory gate control signal that is coupled to the memory gate electrode of all pixels in the array and to switch alternately between a first voltage measured relative to a potential of the substrate and a second voltage measured relative to the potential of the substrate, the second voltage being intermediate between the first voltage and the potential of the substrate, the first voltage being sufficiently different from the potential of the substrate to vertically transfer substantially all photo charge in the photodiode into the memory gate towards the surface of the memory gate electrode in each pixel of the array of pixels, the second voltage being both (1) sufficiently different from the potential of the substrate to hold underneath the memory gate at the surface of the memory gate electrode all photo charge transferred into the memory gate in each pixel of the array of pixels and (2) sufficiently different from the first voltage to block transfer of photo charges in the photodiode into the memory gate in each pixel of the array of pixels; and
   wherein the readout circuitry includes mean for reading out substantially all photo charge transferred into the memory gate in each pixel of the array of pixels on a row-by-row basis while the memory gate control signal is at the second voltage.

2. A method of scanning an array of pixels that are arranged in rows and columns, each pixel comprising a photodiode formed in a substrate of a first conductivity type, a sense node formed in the substrate and a memory gate formed adjacent to the photodiode and insulatively disposed over the substrate, the memory gate including a memory gate electrode having a surface disposed on the substrate, wherein said substrate comprises no region of a conductivity type opposite the first conductivity type underneath said memory gate electrode, each pixel further including a transfer gate being coupled between the memory gate electrode and the sense node, a memory gate control signal being connected to the memory gate electrodes of all pixels in the array, the method comprising:
   switching the memory gate control signal alternately between a first voltage measured relative to a potential of the substrate and a second voltage measured relative to the potential of the substrate, the second voltage being intermediate between the first voltage and the potential of the substrate, the first voltage being sufficiently different from the potential of the substrate to vertically transfer substantially all photo charge in the photodiode into the memory gate in each pixel of the array of pixels, the second voltage being both (1) sufficiently different from the potential of the substrate to hold underneath the memory gate at the surface of the memory gate electrode all photo charge transferred into the memory gate in each pixel of the array of pixels and (2) sufficiently different from the first voltage to block transfer of photo charges in the photodiode into the memory gate in each pixel of the array of pixels; and
   reading out substantially all photo charge transferred into the memory gate in each pixel of the array of pixels on a row-by-row basis while the memory gate control signal is at the second voltage.

3. A method according to claim 2, wherein the reading out of each pixel includes:
   reading out a pixel reference voltage;
   reading out a pixel signal voltage; and
   forming a difference between the pixel reference voltage and the pixel signal voltage.

4. A sensor formed in a substrate, of a first conductivity type the sensor comprising readout circuitry, a memory gate control circuit and an array of pixels arranged in rows and columns, each pixel comprising:
   a photodiode formed in the substrate;
   a sense node formed in the substrate;
   a memory gate insulatively disposed over the substrate and formed adjacent to the photodiode, the memory gate including a memory gate electrode having a surface disposed on the substrate, wherein said substrate comprises no region of a conductivity type opposite the first conductivity type underneath said memory gate electrode; and
   a transfer gate coupled between the memory gate electrode and the sense node,
   wherein the memory gate control signal circuit includes generator to generate a memory gate control signal that is coupled to the memory gate electrode of all pixels in the array and to switch alternately between a first voltage measured relative to a potential of the substrate and a second voltage measured relative to the potential of the substrate, the second voltage being intermediate between the first voltage and the potential of the substrate, the first voltage being sufficiently different from the potential of the substrate to vertically transfer substantially all photo charge in the photodiode into the memory gate in each pixel of the array of pixels, the second voltage being both (1) sufficiently different from the potential of the substrate to hold underneath the memory gate at the surface of the memory gate electrode all photo charge transferred into the memory gate in each pixel of the array of pixels and (2) sufficiently different from the first voltage to block transfer of photo charges in the photodiode into the memory gate in each pixel of the array of pixels; and wherein the readout circuitry includes mean for reading out substantially all photo charge transferred into the memory gate in each pixel of the array of pixels on a row-by-row basis while the memory gate control signal is at the second voltage.

\* \* \* \* \*